United States Patent [19]

Ramsden, Jr.

[11] 3,926,292

[45] Dec. 16, 1975

[54] FORMAT CONTROL TECHNIQUE AND APPARATUS THEREFOR

[75] Inventor: Paul S. Ramsden, Jr., Hudson, N.H.

[73] Assignee: Centronics Data Computer Corporation, Hudson, N.H.

[22] Filed: Aug. 22, 1974

[21] Appl. No.: 499,633

[52] U.S. Cl. .............. 197/1 R; 197/20; 235/61.11 E

[51] Int. Cl.$^2$.... B41J 5/36; B41J 25/00; G06K 7/14

[58] Field of Search ............ 197/1 R, 19, 20; 178/4; 235/61.11 E

[56] References Cited

UNITED STATES PATENTS

| | | | |
|---|---|---|---|
| 2,815,843 | 12/1957 | Bellinger et al. | 197/20 |
| 3,171,529 | 3/1965 | Greene | 197/19 |
| 3,512,623 | 5/1970 | Staugaard | 197/20 |
| 3,524,528 | 8/1970 | Peyton | 197/20 X |
| 3,601,297 | 8/1971 | Funk et al. | 197/20 X |
| 3,639,729 | 2/1972 | Marshall | 235/61.11 E |
| 3,737,629 | 6/1973 | See | 235/61.11 E |
| 3,777,165 | 12/1973 | Bryant et al. | 235/61.11 E X |
| 3,786,236 | 1/1974 | Sato et al. | 235/61.11 E |
| 3,787,702 | 1/1974 | Hujer et al. | 235/61.11 E X |

OTHER PUBLICATIONS

IBM Technical Disclosure Bulletin, Vol. 9, No. 2, July 1966, p. 185, V. C. Martin et al.

*Primary Examiner*—Paul E. Shapiro
*Attorney, Agent, or Firm*—Ostrolenk, Faber, Gerb & Soffen

[57] ABSTRACT

A format control apparatus for printers utilizing a punched paper tape and tape reader. The tape reader is driven by the printer line feed mechansim to move the punch paper tape in unison therewith. A code format which permits a significantly greater number of control functions than the number of information channels in the punch paper tape is utilized, which format greatly simplifies the electronic hardware utilized in the tape reader while providing positive reliable control. For example, the unique code format when utilized with punch paper tape having seven information channels provides a plurality of format control functions equivalent to that obtained from a punched paper tape and reader having twelve information channels.

13 Claims, 7 Drawing Figures

| CONTROL FUNCTION WORD | TAPE CHANNELS GROUP I 1 | 2 | 3 | 4 | GROUP II 5 | 6 | 7 | CONTROL CODE (FROM CONTROL UNIT-14) |
|---|---|---|---|---|---|---|---|---|
| 1 | × | | | | × | | | 0 0 0 1 |
| 2 | × | | | | | × | | 0 0 1 0 |
| 3 | × | | | | | | × | 0 0 1 1 |
| 4 | | × | | | × | | | 0 1 0 0 |
| 5 | | × | | | | × | | 0 1 0 1 |
| 6 | | × | | | | | × | 0 1 1 0 |
| 7 | | | × | | × | | | 0 1 1 1 |
| 8 | | | × | | | × | | 1 0 0 0 |
| 9 | | | × | | | | × | 1 0 0 1 |
| 10 | | | | × | × | | | 1 0 1 0 |
| 11 | | | | × | | × | | 1 0 1 1 |
| 12 | | | | × | | | × | 1 1 0 0 |

FIG. 5a.

| CONTROL FUNCTION WORD | TAPE CHANNELS GROUP I 1 | 2 | 3 | 4 | GROUP II 5 | 6 | 7 | 8 |
|---|---|---|---|---|---|---|---|---|
| 1 | X | | | | X | | | |
| 2 | X | | | | | X | | |
| 3 | X | | | | | | X | |
| 4 | X | | | | | | | X |
| 5 | | X | | | X | | | |
| 6 | | X | | | | X | | |
| 7 | | X | | | | | X | |
| 8 | | X | | | | | | X |
| 9 | | | X | | X | | | |
| 10 | | | X | | | X | | |
| 11 | | | X | | | | X | |
| 12 | | | X | | | | | X |
| 13 | | | | X | X | | | |
| 14 | | | | X | | X | | |
| 15 | | | | X | | | X | |
| 16 | | | | X | | | | X |

FIG. 5b.

| CONTROL FUNCTION WORD | TAPE CHANNELS GROUP I 1 | 2 | 3 | GROUP II 4 | 5 | 6 |
|---|---|---|---|---|---|---|
| 1 | X | | | X | | |
| 2 | X | | | | X | |
| 3 | X | | | | | X |
| 4 | | X | | X | | |
| 5 | | X | | | X | |
| 6 | | X | | | | X |
| 7 | | | X | X | | |
| 8 | | | X | | X | |
| 9 | | | X | | | X |

FORMAT CONTROL TECHNIQUE AND APPARATUS THEREFOR

BACKGROUND OF THE INVENTION

The present invention relates to format control apparatus and more particularly to a novel control apparatus especially advantageous for use with line printers and the like in which a novel format code enables a significantly greater number of functions than the number of information channels in the punched paper tape.

Printers such as, for example, line printers are typically capable of printing forms and other desired formats through the utilization of format control apparatus. For example, line printers typically accept a paper document of indeterminate length, which paper document is perforated at regular intervals to enable the paper document to be torn along the perforations and thereby form a single printed page of any desired format. In such applications and in instances where a large number of pages of substantially the same format are to be printed, it is desirable to provide a tape reader and punch paper tape containing punched code information representative a particular format controls. One typical example is the Top of Form format control in which the first line to be printed for each page of a printed document is located at a predetermined point along the page. By placing a format control tape in the tape reader, and applying a Top of Form function code to the printer electronics, the printer paper feed mechanism is activated to rapidly move the paper document from whatever location it occupies after having completed the last line of print to the Top of Form location for the next page to be printed. By punching the appropriate Top of Form code into the punched paper tape and sensing the presence of this code, the paper document may be rapidly moved at a slew rate to the Top of Form position for the next page to be printed. This example represents only one of a plurality of control functions which are desirous for use with line printers and it is typically desirable to provide a large number of such control functions. For example, certain formats may require up to twelve different format control functions. This is typically obtained through the use of punched paper tape having twelve information channels wherein each channel is dedicated to a particular control function and by punching a hole in that channel at a location associated with the location on the paper document, the paper document may be automatically and rapidly moved to the appropriate line.

The most frequently utilized paper tape readers and punched paper tape are those having six, seven or eight information channels. Since the number of functions desired to be provided for format control functions is quite often greater than the number of information channels in the aforementioned widely used punch paper tape and tape readers, their use in format control in which a large number of format control functions are desired is not practical.

BRIEF DESCRIPTION OF THE INVENTION

The present invention is characterized by providing a novel control format technique and electronic hardware which utilizes a novel control code format to permit the use of punched paper tape having as few as seven information channels to provide as many as twelve control functions thus obtaining operation equivalent to that of a twelve information channel punch paper tape and reader.

The present invention utilizes in one preferred embodiment eight channel tape having seven information channels in which the channels are arranged in two distinct groups with three channels being assigned to a first group and the remaining four channels being assigned to a second group. The code format selected is such that any valid format control code consists of two punched holes, one and only one punched hole appearing in a selected channel of the first group and one and only one punched hole appearing in a selected channel of the second group.

The printer control unit, upon receipt of a format command code, applies a binary code to an encoder device having seven output leads each being coupled to an associated light source such as, for example, a light emitting diode (commonly referred to as an LED). The binary code applied to the encoder causes the encoder to develop output signals at two of its leads so that one and only one LED of a first group of LEDs in the array is illuminated and so that one and only one LED Of a second group in the array is illuminated. The LED array is positioned at the read location of the tape reader and the tape is caused to pass the LED array moving at a rate proportional to the rate of movement of the paper document such that as the paper document moves the distance of one line of characters the paper tape is advanced by one feed hole.

A sensor array comprised of a plurality of photodiodes or phototransistors, for example, is positioned on the opposite side of the punch paper tape so that each of the phototransistors is in alignment with an associated one of the LEDs. A first group of the sensors and a second group of the sensors are coupled to the electronic gating circuitry and when the appropriate punched holes of the format codes pass through the reader station and come into alignment with the illuminated LEDs, the electronic gating circuitry senses the format control word punched in the tape to develop an output signal which terminates the feeding of the paper document. The code format greatly simplifies the electronic circuitry required for detection of format control words while at the same time providing positive and reliable operation. The same technique described hereinabove can be employed for punch paper tape of the eight information channel type or six information channel type with only very slight modification in the electronic gating circuitry. Thus, the novel code format and associated electronic circuitry utilized for detection of the code format provides control functions equivalent to that obtained through nine, twelve or sixteen information channel punch tape through the use of either six, seven or eight information channel punch paper tape which are the most frequently used paper tape and paper tape readers.

It is therefore one object of the present invention to provide a novel format control apparatus utilizing a code format which provides format control functions of significantly greater number than the information channels in the punched paper tape and the tape reader employed in the function control apparatus.

BRIEF DESCRIPTION OF THE FIGURES

The above as well as other objects of the present invention will become apparent when reading the accompanying description and drawings in which.

FIG. 5*a* shows the code format for punch paper tape having eight information channels.

FIG. 5*b* is a table showing the code format for punch paper tape having six information channels.

DETAILED DESCRIPTION OF THE INVENTION

Figures 1, 2, 4:
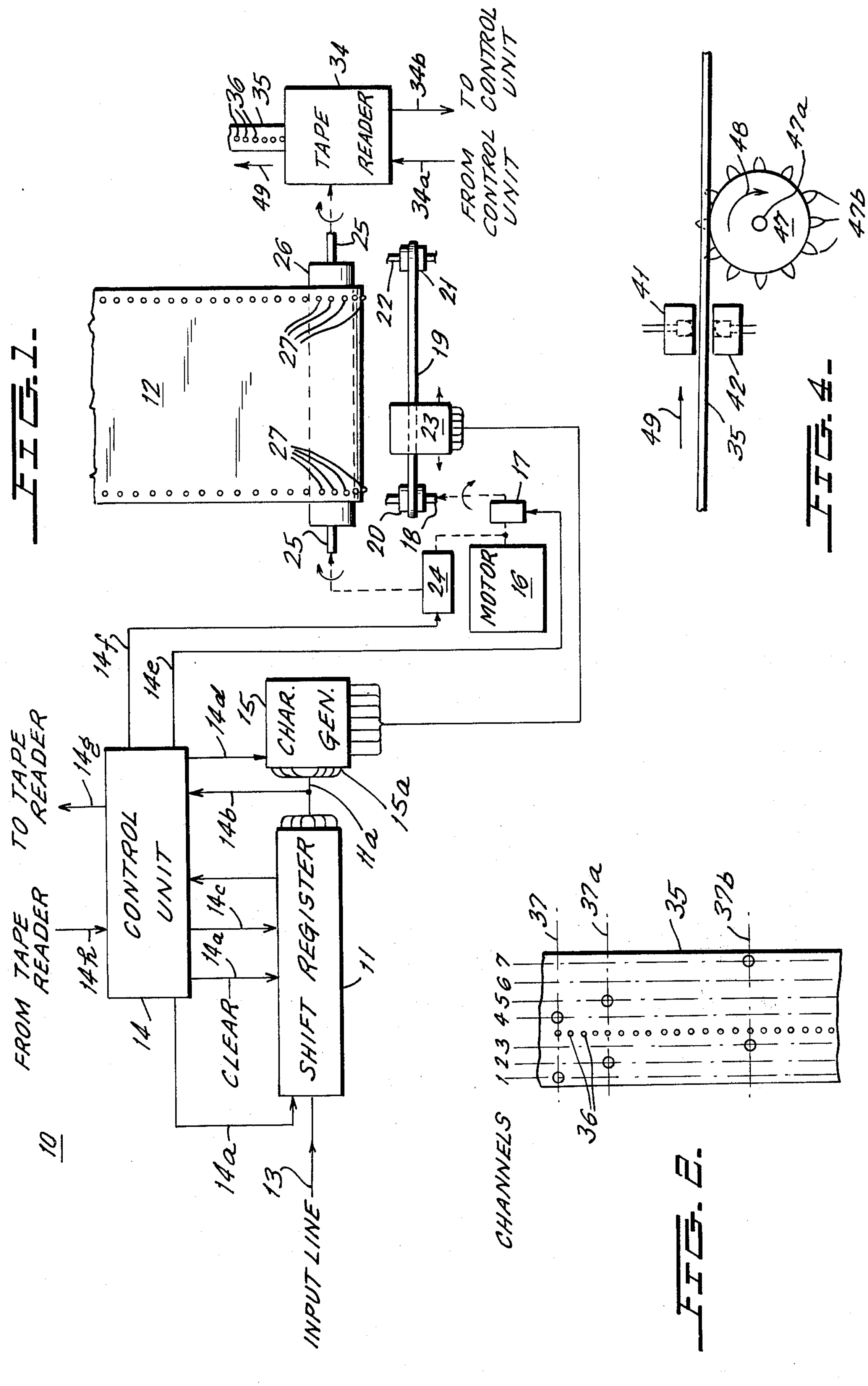
FIG. 1 is a simplified block diagram of the line printer and format control apparatus embodying the principles of the present invention.
FIG. 2 is an enlarged plan view of the paper tape employed in the tape reader of FIG. 1.
FIG. 4 is an elevational view showing the light array, sensor array and tape drive sprocket utilized in the tape reader of FIG. 1.

FIG. 1 shows a printer 10 having a format control tape reader 34.

The printer may, for example, be an impact printer of the dot matrix type such as is described in detail in U.S. Pat. No. 3,703,949 issued Nov. 28, 1972 and assigned to the assignee of the present invention.

The printer 10 utilizes a multistage shift register 11 having a plurality of stages preferably greater in number than the number of characters which may be printed along one line of paper document 12. For example, in an 80-column printer (capable of printing 80 characters per line of print) the shift register 11 may be comprised of 81 stages, each stage being capable of storing a six bit binary word.

Binary coded words are loaded into shift register 11 through input line 13 in a parallel by bit serial by word fashion.

The control unit 14 of the printer initially clears shift register 11 through its output line 14*a* so as to clear out the contents of the shift register. Thereafter, control unit 14 through its output 14*a* loads a "dummy" character into the input stage of shift register 11. Thereafter, binary coded words are applied to input line 13 either from a communications interface or a computer or the keyboard which may form a part of the printer but which has been omitted herein for purposes of simplicity. As each code word, which may either be a character word or a function word, is loaded into shift register 11, control unit 14 applies a shift pulse at output 14*c* to shift register 11 to advance the code words loaded into shift register 11 towards the output stage.

As soon as the dummy character reaches the output stage of shift register 11 it is detected through lead 14*b* of control unit 14 to apply an additional shift pulse to lead 14*c* to shift register 11 to shift the dummy character out of the register. Thus, the output stage will now contain the first character code to be printed and this output code is applied to respective inputs of a character generator 15 which has stored therein the dot matrix patterns for alphabetic characters, numeric characters and punctuation signals, for example. The binary code for the first character to be printed and appearing at the output stage of shift register 11 is applied to one set of inputs 15*a* of character generator 15 which develops a dot column pattern for five successive dot columns.

Output 14*e* of control unit 14 activates a clutch assembly 17 coupled between the output shaft of continuously operating motor 16 and the input shaft 18 of a print head carriage drive belt 19 entrained about a pair of pulley gears 20 and 21 mounted on shafts 18 and 22, respectively. A print head assembly 23 is secured to belt 19 so as to be moved from the left to the right-hand margin of paper document 12 continuously during the printing of a line.

As was mentioned hereinabove, characters are of the dot matrix type whereby a seven row by five column dot pattern containing a total of 35 dot positions is utilized to form each character. FIG. 2 of above mentioned U.S. Pat. No. 3,703,949 shows the dot pattern formats for the numerals 0–6 and the alphabetic characters A–G.

Characters are formed in a dot column by dot column fashion as the print head assembly 23 moves across paper document 12. After five dot columns are completed, control unit 14, through its shift pulse output 14*c* shifts the next character code into the right-hand most or output stage of shift register 11 to apply this character code to character generator 15. Characters are formed across the printed line in this fashion until either the end of the line is reached or until a function code is detected in the output stage of shift register 11 indicating that the line of print is completed. Control unit 14 detects this code and causes clutch 17 to decouple motor 16 from shaft 18 enabling the print head 23 to move from right to left, typically under the control of a spring return device (not shown for purposes of simplicity). A suitable limit switch may be provided to detect the fact that the print head 23 has reached the end of a line of print (i.e. the right-hand margin), which condition is utilized to return the print head to the left-hand margin of the paper document and to execute a single line feed operation. In the case where a line of print terminates before the print head 23 reaches the right-hand margin of the paper document, a line feed code is shifted into register 11 and is detected by control unit 14 to deenergize clutch 17 and thereby enable the print head 23 to return to the left-hand margin under the control of the return spring in readiness for printing the next line.

In order to perform a line feed operation, output 14*f* of control unit 14 energizes clutch 24 to couple the output shaft of motor 16 to the shaft 25 of the paper document advancing mechanism which may, for example, be a cylindrical platen 26 mounted to rotate upon shaft 25 and provide it with a plurality of pins or sprockets 27 which protrude through the equispaced openings 12*a* and 12*b* provided along opposite margins of the paper document 12. The clutch assembly 24 is activated for a time period sufficient to advance paper document 12 by one line space for single line feeds.

The output shaft 25 of platen 26 is mechanically coupled to the tape drive sprocket (to be more fully described hereinbelow) of tape reader 34 for the purpose of advancing the tape 35 each time the paper document 12 is moved. A suitable mechanical linkage between shaft 25 and the tape drive sprocket of tape reader 34 is provided to assure the desired advancement. For example, punch paper tape 35 is provided with feed holes 36 which typically have a 1/10 inch pitch between holes. In one dot matrix printer of the impact type the print line is 1/6 inch. Thus, tape reader 34 and the shaft 25 of the paper feed mechanism are mechanically linked through suitable gearing arrangements or the like such that each line feed advances the paper document 12 by one line at the same time that paper tape 35 is advanced by one sprocket hole.

Tape reader 34 is provided with a plurality of selectively operating light sources and a like plurality of light sensors positioned on opposite sides of paper tape 35.

Let it be assumed that the format of a particular printed page requires that each line of print be spaced by a predetermined number of lines from the last printed line, which number of lines is greater than one. Thus, a function code is applied to input line 13 after the last character of the line being printed is shifted into register 11. After the last character has been printed, control unit 14 shifts the format control function word into the output stage of shift register 11 which is detected by control unit 14 to indicate that a shift of, for example, six lines is to occur before the next line is to be printed. Output 14*g* of control unit 14 is applied to input 34*a* of tape reader 34 to cause a pair of LEDs to be illuminated. Also, control unit 14 activates clutch 24 to begin moving paper document 12. Simultaneously therewith, and under control of shaft 25, the drive sprocket of tape reader 35 is rotated to advance paper tape 35 which is preferably formed of an opaque material. As soon as the code having punched holes in the identical positions of the illuminated LEDs passes the reading station of tape reader 34, this code is detected by detection circuitry to be more fully described to develop a control signal at output 34*b* which is applied to control unit input 14*h* and thereby cause control unit 14*h* to deenergize clutch 24 and thereby terminate the advancement of paper document 12.

FIG. 2 shows the punched paper tape 35 of FIG. 1 in greater detail, which tape is a standard 1 inch wide 8-channel black opaque paper tape having drive sprocket holes 36 located between channels 3 and 4 of the seven information channels provided in the tape. The sprocket holes have a 1/10 inch pitch from center line to center line of adjacent sprocket holes. Format control words are punched into tape 35 by punching holes in selected ones of the channels 1–7 in alignment with each drive sprocket hole 36. For example, one control function code, which may be a Vertical Tab code, is shown as being punched along horizontal dotted line 37 in which holes have been punched in channels 1 and 4. Similarly, a code which may, for example, represent a Top Of Form (TOF) control code comprised of punched holes in channels 2 and 5 is located along horizontal dotted line 37*a*. Horizontal dotted line 37*b* shows another control code which may, for example, be a Bottom Of Form (BOF) control format in which punched holes are provided in channels 3 and 7. A format control tape of any particular length can be created on most teletypewriters containing a paper tape punch or may be created through the use of a manual tape punch wherein the spacing and location of the codes is directly related to the spacing and location of the lines of print to be formed on paper document 12. In instances where the format is to be continuously repeated for each page of a paper document, the tape, after being appropriately punched, may have its forward and rearward ends secured to one another by tape splicing means so as to form a closed loop. The tape is then placed in tape reader 34 and is thereby adapted to continuously repeat the desired format. Obviously, a different tape may be prepared for each different format.

Since many formats require a variety of control functions, it is a major object of the present invention to provide a large number of control functions through the use of conventional six, seven or eight information channel tape.

For example, let it be assumed that a paper tape format control having 12 control functions is desired. In accordance with conventional techniques, this would necessitate the use of a paper tape reader and a punched paper tape having twelve different information channels. The unique code format of the present invention enables the use of conventional tape having only seven information channels to provide twelve separate control functions while at the same time providing simplified control electronics utilized to read the paper tape.

Figures 3, 5:
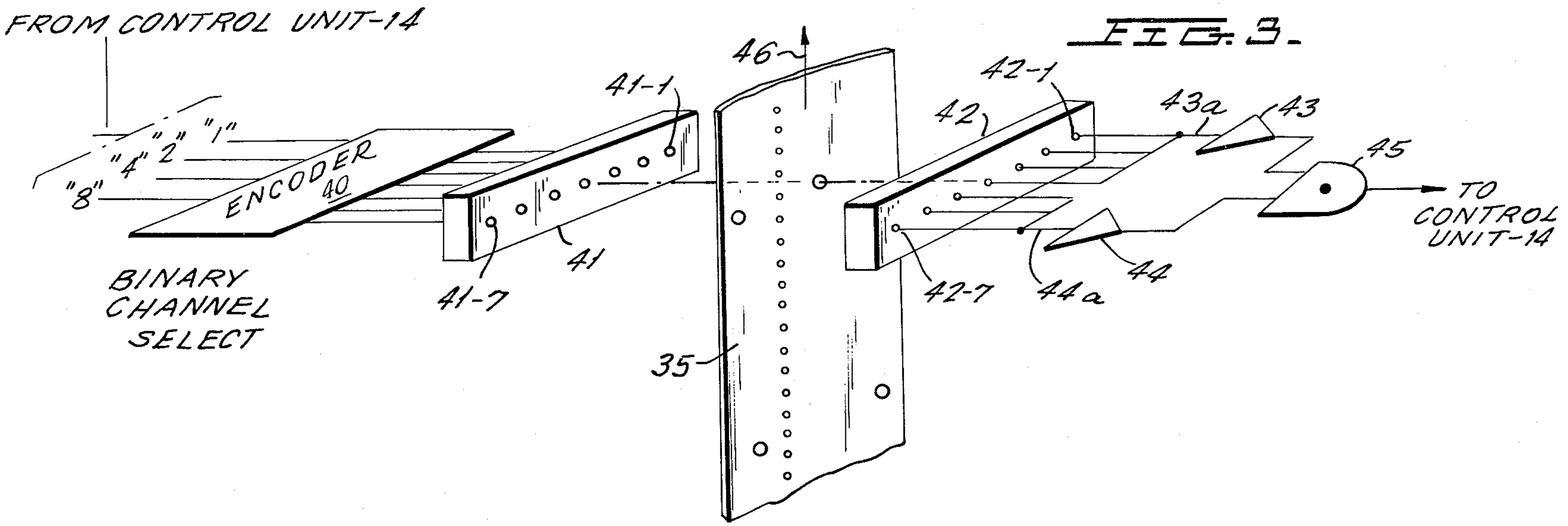
FIG. 3 is a simplified exploded view of the control and sensing means utilized in the tape reader of FIG. 1.
FIG. 5 is a table showing the code format for punch paper tape having seven information channels.

FIG. 5 shows a code format which utilizes the seven information channels of the tape 35 in such a way as to function as an equivalent 12 channel paper tape reader. The seven information channels are divided into two separate groups wherein Group I consists of channels 1–4 and Group II consists of channels 5–7. Each of the control functions are represented by providing a punched hole in one and only one of the channels in channel Group I and simultaneously therewith in one and only one of the channels in channel Group II in the format as shown in FIG. 5. Since only one hole in a group changes at a time, no timing or glitch problems are encountered.

FIG. 3 shows a detailed block diagram of the tape reader electronics which consists of an encoder 40, an array 41 of LEDs 41-1 through 41-7; a sensor array 42 of sensing devices such as, for example, photodiodes or phototransistors 42-1 through 42-7; amplifiers 43 and 44 and an AND gate 45.

The operation of the device is as follows:

Let it be assumed that a code word for control function NO. 6 (see FIG. 5) is loaded into shift register 11. Upon printing of the last character, the code word will be shifted into the output stage of shift register 11 and detected by control unit 14. The control unit 14 applies a four-bit binary code to the inputs of encoder 40 which causes two of the LEDs to be illuminated. For example, considering FIG. 5, let it be assumed that a function control word representative of the function of the control function 7 is desired. When this function code is shifted into the output stage of shift register 11, it is detected by control unit 14 which applies the binary control code 0111 respectively, to the "8", "4", "2", and "1" inputs of encoder 40. This causes encoder 40 to illuminate LEDs 41-3 and 41-5 while the remaining LEDs are not illuminated.

As was mentioned hereinabove, control unit 14 energizes clutch 24 causing paper document 12 to be advanced. Simultaneously therewith, and due to the mechanical coupling referred to hereinabove, the tape drive sprocket of tape reader 34 is advanced by one feed hole for every single line of advancement of the paper document 12. Thus, the punch paper tape 35 which is positioned between arrays 41 and 42, passes between these arrays. The LEDs 41-1 through 41-7 of light array 41 and the phototransistors 42-1 through 42-7 of sensor array 42 are coaligned so that light, for example, which is emitted from LED 41-1 is focused to impinge only upon phototransistor 42-1 and only when a hole in channel 1 of the punched paper tape 35 passes the reading station.

As can best be seen from FIG. 3, the outputs of phototransistors 42-1 through 42-4 are all wired in common to the input 43*a* of amplifier 43. Hence, the common coupling of the outputs of phototransistors 42-1 through 42-4 creates a logical OR function so that if any of the phototransistors 42-1 through 42-4 are activated, a signal will be applied to input 43*a* of amplifier 43.

Similarly, the outputs of phototransistors 42-5 through 42-7 are wired in common to input 44*a* of amplifier 44, likewise providing a logical OR function so that if any one of the phototransistors 42-5 through 42-7 is activated by its associated LED 41-5 through 41-7, a signal will be applied to the input 44*a* of amplifier 44.

The outputs of amplifiers 43 and 44 are coupled to associated inputs of two-input AND gate 45 which will apply an output control signal to control unit 14 only when both of its inputs are simultaneously present.

Considering the example given hereinabove for format control function word NO. 7, LEDs 41-3 and 41-5 are illuminated. As soon as the code word NO. 7, consisting of a punched hole in information channel No. 3 and information channel NO. 5, passes the reading station, the punched holes in these positions will enable light to pass from the illuminated LEDs to phototransistors 42-3 and 42-5 causing these phototransistors to develop output signals. Since both of these phototransistors are wired to separate common terminals, both amplifiers 43 and 44 will both be activated simultaneously to apply signals to the associated inputs of AND gate 45 causing AND gate 45 to develop a control signal indicating that control function word No. 7 has been detected in the punched paper tape and thereby causing control unit 14 to deactivate the clutch assembly 24 and thus halt the movement of paper document 12. If desired, a braking mechanism may also be employed to abruptly halt movement of the paper document. Also, paper movement may be performed in incremental steps with the control signal at the output of gate 45 causing subsequent incremental steps to be terminated thereby halting the paper document 12 at the appropriate line position for the next line to be printed.

FIG. 4 shows an elevational view of the tape reader station in which the LED array 41 is positioned above tape 35 and the phototransistor array 42 is positioned beneath tape 35. A tape drive sprocket 47 is mounted upon shaft 47*a* which is mechanically coupled through suitable mechanical linkages to platen shaft 25 (see FIG. 1) to cause rotation of the paper tape drive sprocket in a direction shown by arrow 48. The individual sprocket pins 47*b* each enter into a feed hole 36 (see FIGS. 1 and 2) to advance the punch paper tape in the direction shown by arrow 49.

FIGS. 5*a* and 5*b* show arrangements in which a conventional paper tape having six and eight information channels may be utilized to develop a code format similar to that described hereinabove and which has a capability of providing either nine or as many as sixteen control function words. Paper tapes having either six, seven or eight information channels are most frequently used punch paper tape formats. The unique tape reader circuitry remains substantially identical to that described hereinabove in connection with paper tape having seven information channels, the only difference being that encoder 40 is provided with either six or eight outputs for selectively energizing one and only one LED in a first group of three or four LEDs and one and only one LED in a second group of three or four LEDs, there being a total of either six or eight LEDs provided. Similarly, sensor array 42 is provided with either six or eight phototransistors, three or four in each group with the three or four phototransistors of the first group being wired together to perform the OR function and with the remaining three or four phototransistors being wired in common to likewise provide the OR function. The remaining circuitry, namely amplifiers 43 and 44 and gate circuit 45 remain identical. These alternative arrangements can be seen to provide the functions equivalent to either nine or sixteen information channel paper tape reader through the utilization of only six or eight actual information channels while retaining all of the advantageous features of the seven information channel tape described hereinabove.

It can be seen from the foregoing description that the present invention provides a novel control format apparatus especially adapted for vertical format control of printers and the like wherein a large number of vertical format control functions greater in total number than the number of information channels utilized in the paper tape reader are provided.

What is claimed is:

1. Format control apparatus for printers having means for advancing a paper document and printing means movable relative to said paper document, said format control apparatus comprising:

a data storage medium for storing format data words representing the desired printing format, said medium having a plurality of information channels;

said channels being assigned to first and second groups, each format data word being comprised of one and only one data bit located in a selected channel of said first information channel group and one and only one data bit located in a selected channel of said second information channel group;

scanning means for reading said medium;

means coupled to said paper document advancing means for advancing said medium through said scanning means whenever said advancing means is energized; said scanning means including means for receiving a format control command;

said scanning means including means for comparing the code words in said medium with said format control command;

means responsive to said comparing means for terminating said advancing means whenever a code word in said medium passing said scanning means corresponds to said format control command.

2. The apparatus of claim 1 wherein said medium comprises an opaque elongated tape having first and second information channel groups;

a data bit being stored in an information channel of each group in the form of a punched hole.

3. The apparatus of claim 2 wherein said scanning means comprises first and second lamp arrays each having a plurality of lamps respectively equal in number to the number of information channels in the first and second groups of said tape;

means responsive to said format control command for illuminating one and only one lamp in each of said arrays.

4. The apparatus of claim 3 wherein said comparing means is further comprised of first and second groups of light sensitive elements being activated whenever a punched hole in said tape is aligned with an illuminated lamp;

gating means for generating an output whenever an element in each of said first and second groups is activated.

5. The apparatus of claim 4 wherein said gating means comprises first and second OR gates each having a plurality of inputs respectively coupled to the first and second groups of light sensitive elements, and an AND gate coupled to the outputs of said first and second OR gates.

6. The apparatus of claim 5 wherein said format control command is a binary digital code command;

said receiving means comprising an encoder responsive to said binary digital code for selectively illuminating one and only one lamp in each of said first and second lamp arrays in accordance with the applied binary digit code.

7. The apparatus of claim 6 wherein said lamps are light emitting diodes.

8. The apparatus of claim 6 wherein said light sensitive elements are photodiodes.

9. The apparatus of claim 6 wherein said light sensitive elements are phototransistors.

10. The apparatus of claim 2 wherein said tape contains seven information channels, four of said channels being assigned to one of said groups and the remaining channels being assigned to the remaining one of said groups to provide a total of 12 format control codes.

11. The apparatus of claim 2 wherein said tape contains six information channels, three of said channels being assigned to one of said groups and the remaining channels being assigned to the remaining one of said groups to provide a total of 9 format control codes.

12. The apparatus of claim 2 wherein said tape contains eight information channels, four of said channels being assigned to one of said groups and the remaining channels being assigned to the remaining one of said groups to provide a total of 16 format control codes.

13. The apparatus of claim 2 wherein said tape is provided with feed holes for advancing the tape;

said means coupling said reader means to said advancing means being adapted to advance said tape by one feed hole each time said paper document is advanced by one line.

* * * * *